United States Patent
Bang et al.

(10) Patent No.: US 9,520,620 B2
(45) Date of Patent: *Dec. 13, 2016

(54) BATTERY PACK OF NOVEL STRUCTURE

(75) Inventors: Seung Hyun Bang, Cheongwon-gun (KR); Hyun Han, Seoul (KR); Chun Yeon Kim, Cheongwon-gun (KR); Bum Choi, Daejeon (KR); Sooryoung Kim, Cheongwon-gun (KR); Young Sun Park, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 253 days.

This patent is subject to a terminal disclaimer.

(21) Appl. No.: 13/700,307

(22) PCT Filed: May 21, 2011

(86) PCT No.: PCT/KR2011/003741
§ 371 (c)(1),
(2), (4) Date: Mar. 5, 2013

(87) PCT Pub. No.: WO2011/149223
PCT Pub. Date: Dec. 1, 2011

(65) Prior Publication Data
US 2013/0157085 A1    Jun. 20, 2013

(30) Foreign Application Priority Data
May 28, 2010 (KR) .................. 10-2010-0050375

(51) Int. Cl.
*H01M 10/42* (2006.01)
*H01M 2/10* (2006.01)
(Continued)

(52) U.S. Cl.
CPC ......... *H01M 10/425* (2013.01); *H01M 2/1061* (2013.01); *H01M 2/20* (2013.01);
(Continued)

(58) Field of Classification Search
CPC . H01M 2/20–2/206; H01M 10/0431–10/0436; H01M 10/425
See application file for complete search history.

(56) References Cited

U.S. PATENT DOCUMENTS

| 2002/0061436 A1* | 5/2002 | Inagaki et al. ............... 429/120 |
| 2002/0102457 A1* | 8/2002 | Oogami et al. ............... 429/159 |

(Continued)

FOREIGN PATENT DOCUMENTS

| JP | 10-144356 A | 5/1998 |
| JP | 2000-200593 A | 7/2000 |

(Continued)

OTHER PUBLICATIONS

Machine translation of JP 2003-019569 (Jan. 2003).*
(Continued)

*Primary Examiner* — Jonathan Crepeau
*Assistant Examiner* — Jacob Buchanan
(74) *Attorney, Agent, or Firm* — Birch, Stewart, Kolasch & Birch, LLP (57) ABSTRACT

Disclosed herein is a battery pack including (a) a battery cell array comprising two or more battery cells, each of which has an electrode assembly of a cathode/separator/anode structure disposed in a battery case together with an electrolyte in a sealed state, arranged in the lateral direction, (b) a protection circuit module (PCM) including connection terminals connected to electrode terminals of the battery cells by resistance welding, metal plates to electrically connect the battery cells to each other, and a protection circuit to control an operation of the battery pack, the PCM being connected to the upper end of the battery cell array, and (c) a pack case in which the battery cell array and the protection circuit module are disposed, wherein electrical connection regions between cathode terminals of the battery (Continued)

cells and the protection circuit module are configured to have a structure in which conductive plates attached to the tops of the respective connection terminals of the protection circuit module are welded so that the conductive plates surround the respective cathode terminals of the battery cells.

14 Claims, 7 Drawing Sheets

(51) Int. Cl.
  *H01M 2/20* (2006.01)
  *H01M 2/34* (2006.01)
(52) U.S. Cl.
  CPC ............ *H01M 2/204* (2013.01); *H01M 2/34* (2013.01); *H01M 2200/00* (2013.01); *H01M 2220/30* (2013.01)

(56) References Cited

U.S. PATENT DOCUMENTS

| 2005/0100783 | A1* | 5/2005 | Ro et al. ....................... 429/159 |
| 2007/0141457 | A1* | 6/2007 | Amagai ......................... 429/152 |
| 2007/0196731 | A1* | 8/2007 | Hyung et al. ................. 429/164 |
| 2009/0081485 | A1* | 3/2009 | Heo ................................. 429/7 |
| 2009/0176156 | A1* | 7/2009 | Lee ................................. 429/178 |
| 2010/0098973 | A1  | 4/2010 | Lee et al. |
| 2010/0266891 | A1  | 10/2010 | Kwon et al. |
| 2011/0086243 | A1* | 4/2011 | Bae et al. ......................... 429/7 |

FOREIGN PATENT DOCUMENTS

| JP | 2001-266820 A |   | 9/2001 |   |   |
|----|---------------|---|--------|---|---|
| JP | 2002-141051 A |   | 5/2002 |   |   |
| JP | 2002-216722 A |   | 8/2002 |   |   |
| JP | 2003-19569 A  |   | 1/2003 |   |   |
| JP | 2003019569 A  | * | 1/2003 | ............ B23K 11/20 |
| JP | 2005123127 A  | * | 5/2005 | ............ H01M 2/02 |
| JP | 2008-270350 A |   | 11/2008 |   |   |
| KR | 10-0635743 B1 |   | 10/2006 |   |   |
| KR | 10-2007-0075709 A |   | 7/2007 |   |   |
| KR | 10-2008-0047982 A |   | 5/2008 |   |   |
| KR | 10-2009-0037769 A |   | 4/2009 |   |   |
| KR | 10-2009-0064069 A |   | 6/2009 |   |   |

OTHER PUBLICATIONS

Machine translation of JP 2005-123127 (May 2005).*
Machine translation of JP 2001-266820 (Sep. 2001).*
International Search Report issued in PCT/KR2011/003741, mailed on Nov. 23, 2011.

* cited by examiner

BATTERY PACK OF NOVEL STRUCTURE

TECHNICAL FIELD

The present invention relates to a battery pack of a novel structure, and, more particularly, to a battery pack including a battery cell array comprising two or more battery cells arranged in the lateral direction, a protection circuit module (PCM) including connection terminals, metal plates and a protection circuit, the PCM being connected to the upper end of the battery cell array, and a pack case, wherein electrical connection regions between cathode terminals of the battery cells and the protection circuit module are configured to have a structure in which conductive plates attached to the tops of the respective connection terminals of the protection circuit module are welded so that the conductive plates surround the respective cathode terminals of the battery cells.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent preservation and service-life characteristics, which has been widely used as an energy source for various electronic products as well as mobile devices.

However, various kinds of combustible materials are contained in the lithium secondary battery. As a result, the lithium secondary battery may be heated or explode due to the overcharge of the battery, the overcurrent in the battery, or other external physical impact. That is, the safety of the lithium secondary battery is very low. Consequently, safety elements, such as a positive temperature coefficient (PTC) element and a protection circuit module (PCM), to effectively control an abnormal state of the lithium secondary battery, such as the overcharge of the lithium secondary battery or the overcurrent in the lithium secondary battery, are loaded on the lithium secondary battery in a state in which the safety elements are connected to a battery cell.

Generally, the PCM is connected to the battery cell via conductive nickel plates by welding or soldering. That is, the nickel plates are connected to connection terminals of the PCM by welding, and then the nickel plates are connected to corresponding electrode terminals of the battery cell by welding. In this way, the PCM is connected to the battery cell to manufacture a battery pack.

Figure 1:
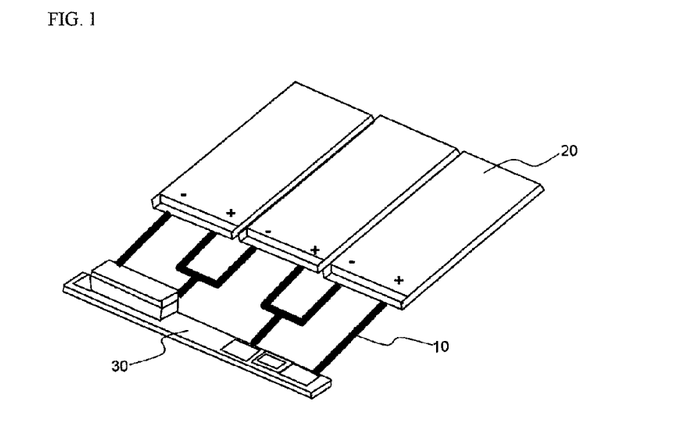
FIG. 1 is a typical view showing a structure in which conventional pouch-shaped battery cells are electrically connected to each other.

Specifically, a method of manufacturing the battery pack will be described with reference to FIG. 1. Nickel plates 10 are connected to cathode terminals and anode terminals of battery cells 20 by welding so that the battery cells 20 can be connected in series or in parallel to each other. Subsequently, the nickel plates 10 are electrically connected to connection terminals of a PCM 30 by welding to complete a battery pack. At this time, series or parallel electrical connection between the battery cells is achieved depending upon the connection structure of the nickel plates.

However, the above battery pack is manufactured through two steps, i.e. by electrically connecting the battery cells in series or in parallel to each other using the nickel plates and connecting the nickel plates to the PCM by welding. As a result, the structure and manufacturing process of the battery pack are complicated, the manufacturing costs of the battery pack are increased, and a defect rate of the battery pack is increased.

Therefore, there is a high necessity for a structure in which the number of welding times is minimized during electrical connection between the electrode terminals of the battery cells and the PCM.

Figure 2:
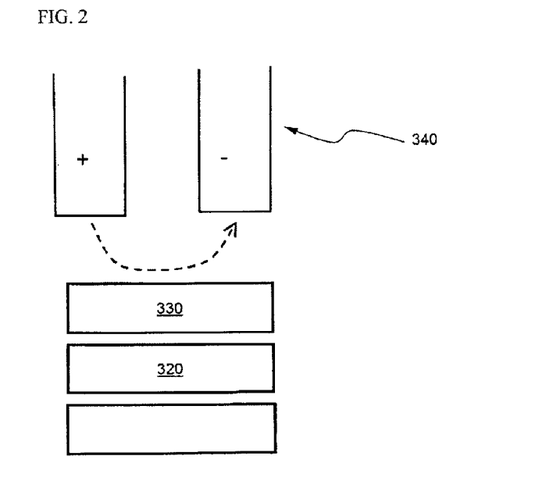
FIG. 2 is a typical view showing a conventional resistance welding structure.

To this end, a nickel plate of a PCM may be welded to a cathode terminal, which is an aluminum terminal, of a battery cells using a resistance welding rod (see FIG. 2). In this case, however, electric current generated from an anode of the welding rod 340 flows to a cathode of the nickel plate 320 via only the aluminum terminal 330 in a state in which the electric current does not reach the nickel plate 320 since the resistance of the aluminum terminal 330 is lower than that of the nickel plate 320. As a result, welding between the nickel plate 320 of the PCM and the aluminum terminal 330 of the battery cell through resistance welding may not be achieved, or welding coupling force therebetween may be low.

Therefore, there is a high necessity for a battery pack having a specific structure to achieve electrical connection between the nickel plate of the PCM and the aluminum terminal of the battery cell through resistance welding.

Meanwhile, a battery pack mounted in a laptop computer requires high power and large capacity. To this end, a conventional cylindrical battery pack including a plurality of cylindrical battery cells has generally been used. In recent years, however, the size of a laptop computer has been reduced, and therefore, there is a high necessity for a slim type battery pack.

Therefore, there is a high necessity for a technology in which pouch-shaped battery cells are used to manufacture a slim type battery pack, thereby increasing capacity of the battery pack, and electrode terminals of the battery cells are directly electrically connected to connection terminals of a PCM, thereby simplifying a process of manufacturing a battery pack and minimizing overall size of the battery pack.

DISCLOSURE

Technical Problem

Therefore, the present invention has been made to solve the above problems, and other technical problems that have yet to be resolved.

Specifically, it is an object of the present invention to provide a battery pack in which two or more battery cells are included to provide high power and large capacity, welding between electrode terminals of the battery cells and a protection circuit module is achieved with high weldability, and the battery pack has a compact structure.

It is another object of the present invention to provide a large capacity battery pack, which is manufactured using a simple and easy method and a manufacturing process of which is simplified, thereby reducing manufacturing costs of the battery pack.

Technical Solution

In accordance with one aspect of the present invention, the above and other objects can be accomplished by the provision of a battery pack including (a) a battery cell array comprising two or more battery cells, each of which has an electrode assembly of a cathode/separator/anode structure disposed in a battery case together with an electrolyte in a sealed state, arranged in the lateral direction, (b) a protection circuit module (PCM) including connection terminals connected to electrode terminals of the battery cells by resistance welding, metal plates to electrically connect the battery cells to each other, and a protection circuit to control an operation of the battery pack, the PCM being connected to the upper end of the battery cell array, and (c) a pack case in which the battery cell array and the protection circuit module are disposed, wherein electrical connection regions between cathode terminals of the battery cells and the protection circuit module are configured to have a structure in which conductive plates attached to the tops of the respective connection terminals of the protection circuit module are welded so that the conductive plates surround the respective cathode terminals of the battery cells.

That is, in the battery pack according to the present invention, the battery cells are arranged in the lateral direction based on desired capacity of the battery pack, the connection terminals of the protection circuit module and the electrode terminals of the battery cells are directly connected to each other with high welding coupling force via the conductive plates, which are configured to have a specific structure, and the battery cells are electrically connected in series and/or in parallel to each other via the metal plates included in the protection circuit module. Consequently, it is possible to easily manufacture a large capacity or high power battery pack through the use of a simple method.

For example, in a case in which a battery pack is constituted by three battery cells, the battery cells are arranged in the lateral direction to constitute a battery cell array, the battery cell array and a PCM are disposed at a pack case, and electrode terminals of the battery cells and connection terminals of the PCM are connected to each other by resistance welding, thereby manufacturing a desired battery pack.

Also, for a battery pack requiring high power, the metal plates included in the PCM are connected in series to each other in a state in which the electrode terminals of the battery cell array are welded to the connection terminals of the PCM. On the other hand, for a battery pack requiring long-term use, the metal plates included in the PCM are connected in parallel to each other in a state in which the electrode terminals of the battery cell array are welded to the connection terminals of the PCM. Consequently, it is possible to selectively manufacture a desired battery pack based on needs and uses thereof.

The battery cell array may be constituted by arranging a plurality of battery cells in the lateral direction based on desired capacity of the battery pack as previously described. For example, the battery cell array preferably includes three battery cells for a device, such as a laptop computer, requiring long-term use and portability.

The battery cells may be selectively connected in series or in parallel to each other based on desired power and capacity of an external device in which the battery pack according to the present invention is installed. For example, the battery cells may be connected in parallel to each other if it is necessary for the battery cells to provide large capacity for a long time. On the other hand, the battery cells may be connected in series to each other if it is necessary for the battery cells to provide high power for a short time.

In a preferred example, the conductive plates may be attached to the connection terminals of the protection circuit module so that the conductive plates can be bent, the conductive plates may be bent in a bracket shape in a state in which the cathode terminals of the battery cells are placed on the conductive plates, and resistance welding may be carried out from above the bent portions of the conductive plates, thereby achieving physical coupling and electrical connection between the connection terminals of the protection circuit module and the cathode terminals of the battery cells.

The shape of the conductive plates is not particularly restricted so long as the conductive plates can be easily bent. For example, the conductive plates may be formed in an L shape in a state in which the conductive plates are attached to the corresponding connection terminals of the protection circuit module.

In another example, each of the conductive plates may include a first connection part attached to the top of a corresponding one of the connection terminals of the protection circuit module and a second connection part attached to the top of the cathode terminal of a corresponding one of the battery cells. Consequently, the connection between the cathode terminals of the battery cells and the connection terminals of the protection circuit module is more securely achieved. In addition, when external force is applied to the battery pack, deformation of the electrical connection regions between the cathode terminals of the battery cells and the protection circuit module is prevented.

The material composing each of the conductive plates is not particularly restricted so long as the conductive plates can provide high coupling force when the conductive plates are welded as described above. Preferably, each of the conductive plates is a nickel plate, and each of the cathode terminals of the battery cells is an aluminum terminal.

Consequently, electric current from a resistance welding rod during resistance welding between the nickel plate and the aluminum terminal flows from the nickel plate, resistance of which is high, to the aluminum terminal, resistance of which is low, with the result that the resistance welding between the nickel plate and the aluminum terminal is easily achieved.

In the battery pack according to the present invention, any battery cells may be used in various manners irrespective of the kind and shape of the battery cells. A pouch-shaped secondary battery, preferably a pouch-shaped lithium secondary battery, may be used as each battery cell of the battery pack.

According to circumstances, an external input and output terminal to input electric current to the battery pack, to output electric current from the battery pack, and to transmit and receive information to and from the battery pack may be mounted at the front of the protection circuit module in a depressed form.

In this structure, the battery pack can be stably connected to an external device through the external input and output terminal since the external input and output terminal is configured to have a connector structure.

Preferably, the metal wires to electrically connect the battery cells to each other are formed at the top of the protection circuit module. In this structure, it is possible to easily manufacture the PCM and to easily assemble the battery pack as compared with a conventional battery pack structure in which metal wires are formed at a layer in the protection circuit of the PCM so as to electrically connect battery cells to each other.

Preferably, the pack case includes a lower case, at which the battery cell array and the protection circuit module are disposed, and an upper case to cover the lower case so that the battery cell array and the protection circuit module are fixed in place.

The lower case may be partitioned into a battery cell mounting part, at which the battery cells are disposed, and a protection circuit module mounting part, at which the protection circuit module is disposed, and a partition wall may be formed at the interface between the battery cell mounting part and the protection circuit module mounting part.

Also, openings, through which electrode terminals of the battery cells are exposed toward the protection circuit module, may be formed at portions of the partition wall corresponding to electrical connection regions between the electrode terminals of the battery cells and the protection circuit module.

In this pack case structure, it is possible to restrain contact between the electrode terminals of the battery cells and the parts of the protection circuit module since the partition wall is formed at the interface between the battery cell mounting part and the protection circuit module mounting part. Also, even when an electrolyte leaks from one or more of the battery cells, the electrolyte is prevented from flowing to the protection circuit module, thereby preventing the occurrence of a short circuit.

Also, since the openings, through which the electrode terminals of the battery cells are exposed toward the protection circuit module, are formed at portions of the partition wall corresponding to the electrical connection regions between the electrode terminals of the battery cells and the protection circuit module, it is possible to easily weld the electrode terminals of the battery cells, which are exposed through the openings, to the connection terminals of the protection circuit module.

The height of the partition wall may be sufficient to fully isolate the battery cell mounting part and the protection circuit module mounting part from each other.

According to circumstances, the protection circuit module mounting part may be provided with an external input and output terminal mounting part, in which an external input and output terminal to input electric current to the battery pack, to output electric current from the battery pack, and to transmit and receive information to and from the battery pack is mounted.

In a preferred example of the above structure, an external input and output terminal opening may be partially formed at a front of the upper case in a state in which the external input and output terminal opening has a size corresponding to the external input and output terminal so that the external input and output terminal is exposed above. Consequently, power from the battery pack can be easily supplied to an external device via the external input and output terminal.

The protection circuit module mounting part may be configured to have a structure including support parts to support the electrical connection regions between the electrode terminals of the battery cells and the protection circuit module.

The shape of the support parts is not particularly restricted so long as the support parts can easily support the electrical connection regions between the electrode terminals of the battery cells and the protection circuit module. For example, the support parts may be formed on the lower case in the shape of an upward protrusion.

In another example, the support parts may be formed in the shape of a cross-shaped protrusion. Consequently, it is possible for the support parts to more stably support the electrical connection regions between the electrode terminals of the battery cells and the protection circuit module during resistance welding between the electrode terminals of the battery cells and the protection circuit module.

In accordance with another aspect of the present invention, there is provided a protection circuit module (PCM) mounted to a battery pack Specifically, the PCM includes a PCM main body having a protection circuit to control overcharge, overdischarge and overcurrent, connection terminals formed at positions of the PCM main body corresponding to the electrode terminals of the battery cells so as to directly electrically connect the battery cells to each other, metal wires formed at the top of the PCM main body to electrically connect the connection terminals to each other, and an external input and output terminal mounted at the front of the PCM main body in a depressed form to input electric current to the battery pack, to output electric current from the battery pack, and to transmit and receive information to and from the battery pack.

In the protection circuit module according to the present invention, an abnormal state of the battery pack is controlled by the PCM main body, and series and/or parallel electrical connection between the battery cells are achieved by the metal wires.

In accordance with a further aspect of the present invention, there is provided a laptop computer including the battery pack with the above-stated construction as a power source.

However, the battery pack according to the present invention may be manufactured so as to provide power and capacity required by a device by varying the number of battery cells constituting the battery pack. Of course, therefore, the battery pack according to the present invention can be applied to various devices requiring a variable battery capacity in addition to the laptop computer.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 3:
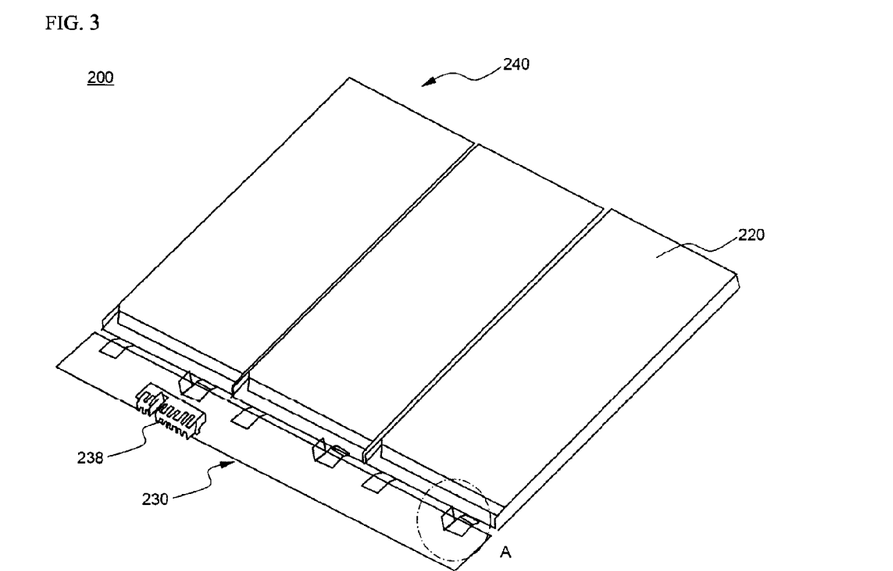
FIG. 3 is a perspective view showing a structure in which pouch-shaped battery cells according to an embodiment of the present invention are electrically connected to each other.
Figure 4:
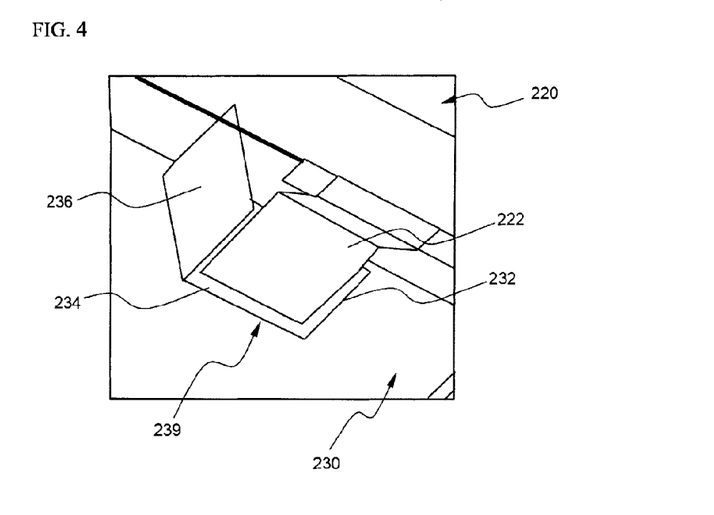
FIG. 4 is an enlarged view typically showing a region A of FIG. 3.

FIG. 3 is a perspective view typically showing a structure in which pouch-shaped battery cells according to an embodiment of the present invention are electrically connected to each other, and FIG. 4 is an enlarged perspective view showing a region A of FIG. 3.

Referring to these drawings, a battery pack 200 according to the present invention includes a battery cell array 240 including three battery cells 220 arranged in the lateral direction, a protection circuit module 230 connected to the upper end of the battery cell array 240, a pack case (not shown) in which the battery cell array 240 and the protection circuit module 230 are disposed.

Each of the battery cells 220 is a pouch-shaped secondary battery configured so that an electrode assembly having a cathode/separator/anode structure is disposed in a battery case together with an electrolyte in a sealed state.

The protection circuit module 230 includes connection terminals 232 connected to electrode terminals 222 of the battery cells 220 by resistance welding, metal wires (not shown) to electrically connect the connection terminals 232 to each other, and a protection circuit (not shown) to control the operation of the battery pack 200.

An electrical connection region A between the cathode terminal 222 of each of the battery cells 220 and the protection circuit module 230 is configured to have a structure in which a conductive plate 239 attached to a corresponding one of the connection terminals 232 of the protection circuit module 230 surrounds the cathode terminal 222 of each of the battery cells Also, the conductive plate 239, which may be a nickel plate, includes a first connection part 234 attached to the top of the corresponding connection terminal 232 of the protection circuit module 230 and a second connection part 236 attached to the top of the cathode terminal, which may be an aluminum terminal, of the corresponding battery cell.

Specifically, the conductive plate 239 is attached to the top of the corresponding connection terminal 232 of the protection circuit module 230 in an L shape. The conductive plate 239 is bent in a bracket shape in a state in which the cathode terminal 222 of the corresponding battery cell 220 is placed at the top of the first connection part 234 of the conductive plate 239, and then resistance welding is carried out from above the second connection part 236, which is a bent portion of the conductive plate 239.

Meanwhile, an external input and output terminal, i.e. a connector 238, which inputs electric current to the battery pack, outputs electric current from the battery pack, and transmits and receives information to and from the battery pack, is mounted at the front of the protection circuit module 230 in a depressed form.

Figure 5:
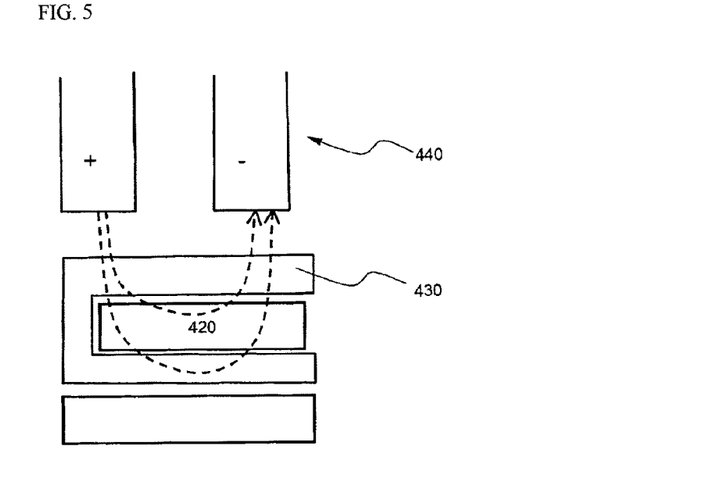
FIG. 5 is a typical view showing a resistance welding structure of the present invention.

FIG. 5 is a typical view showing a resistance welding structure of the present invention.

Referring to FIG. 5, electric current generated from a resistance welding rod 440 during resistance welding between a nickel plate 430 and an aluminum terminal 420 flows from the nickel plate 430, resistance of which is high, to the aluminum terminal 420, resistance of which is low, and then flows back to the nickel plate 430. At this time, heat is generated from the interface between the aluminum terminal 420 and the nickel plate 430 due to resistance difference therebetween with the result that the resistance welding between the nickel plate 430 and the aluminum terminal 420 is easily achieved.

Figure 6:
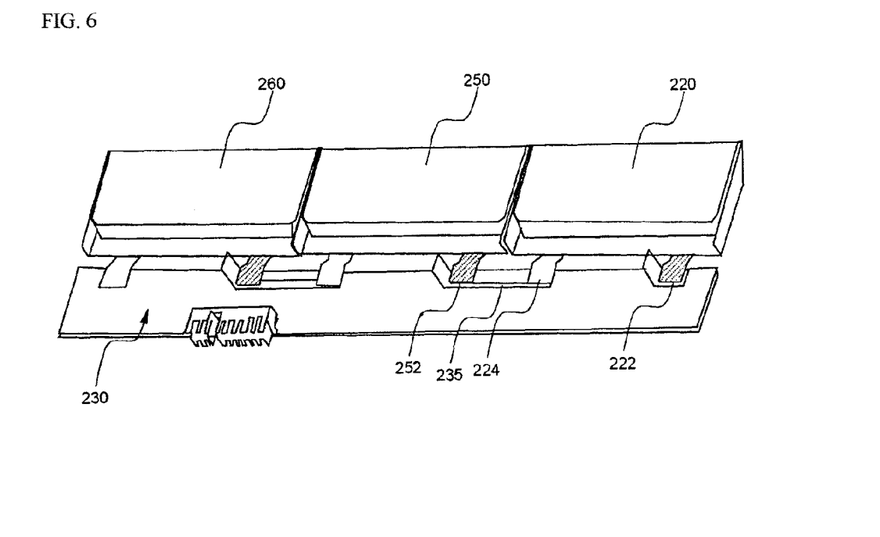
FIG. 6 is a partial perspective view showing a structure in which pouch-shaped battery cells according to another embodiment of the present invention are electrically connected to each other.
Figure 7:
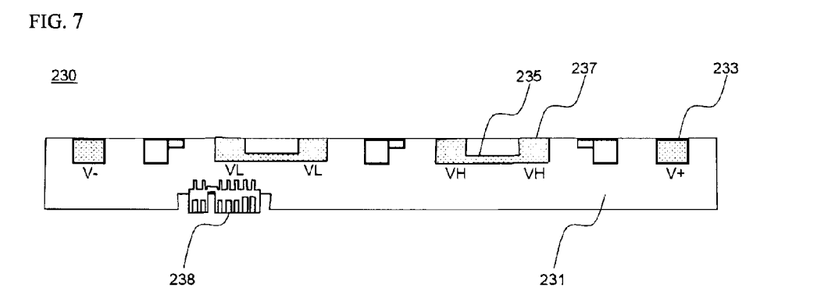
FIG. 7 is an enlarged plan view typically showing a protection circuit module (PCM) of FIG. 6.

FIG. 6 is a partial perspective view typically showing a structure in which pouch-shaped battery cells according to another embodiment of the present invention are electrically connected to each other, and FIG. 7 is an enlarged plan view typically showing a protection circuit module (PCM) of FIG. 6.

Referring to these drawings, metal wires 235 to electrically connect battery cells 220, 250 and 260 to each other are formed at the top of a protection circuit module 230 in a structure in which an anode terminal 224 of the first battery cell 220 is connected in series to a cathode terminal 252 of the second battery cell 250.

Also, the protection circuit module 230 includes a PCM main body 231 having a protection circuit to control overcharge, overdischarge and overcurrent, connection terminals 233 and 237 formed at positions of the PCM main body 231 corresponding to the electrode terminals of the battery cells 220, 250 and 260 so as to directly electrically connect the battery cells 220, 250 and 260 to each other, metal wires 235 formed at the top of the PCM main body 231 to electrically connect the connection terminals 233 and 237 to each other, and an external input and output terminal 238 mounted at the front of the PCM main body 231 in a depressed form to input electric current to the battery pack, to output electric current from the battery pack, and to transmit and receive information to and from the battery pack.

Figure 8:
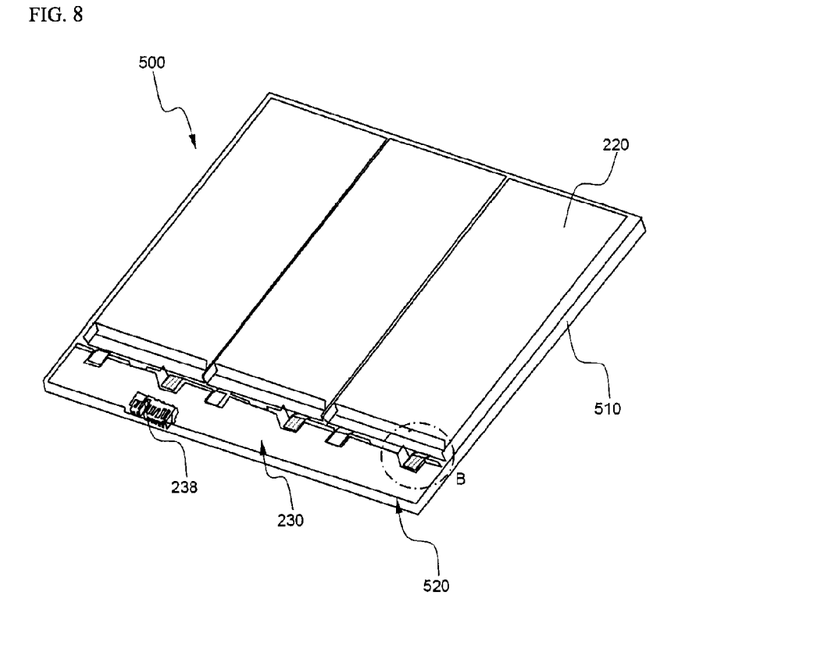
FIG. 8 is a perspective view showing a structure in which the pouch-shaped battery cells and the PCM of FIG. 6 are mounted to a lower case.
Figure 9:
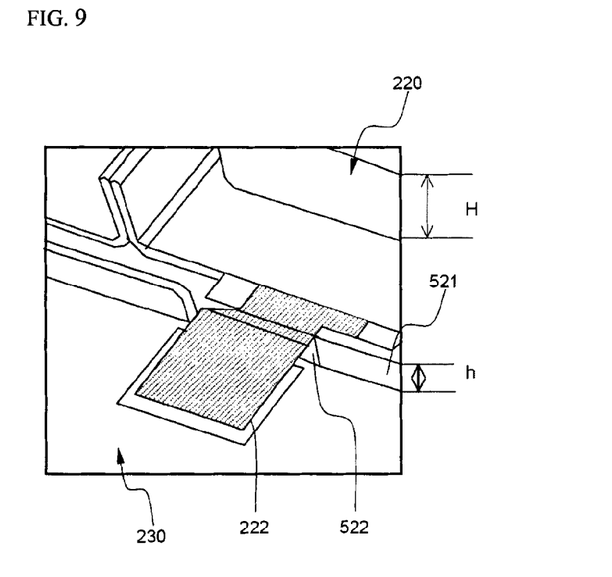
FIG. 9 is an enlarged view typically showing a region B of FIG. 8.

FIG. 8 is a perspective view typically showing a structure in which the battery cell array and the PCM of FIG. 6 are mounted to a lower case, and FIG. 9 is an enlarged view typically showing a region B of FIG. 8.

Referring to these drawings, a lower case 500 is partitioned into a battery cell mounting part 510, at which the battery cells 220 are disposed, and a protection circuit module mounting part 520, at which the protection circuit module 230 is disposed.

A partition wall 521 is formed at the interface between the battery cell mounting part 510 and the protection circuit module mounting part 520. Openings 522, through which electrode terminals 222 of the battery cells 220 are exposed toward the protection circuit module 230, are formed at portions of the partition wall 521 corresponding to electrical connection regions between the electrode terminals 222 of the battery cells 220 and the protection circuit module 230.

The partition wall 521 has a height h sufficient to fully isolate the battery cell mounting part 510 and the protection circuit module 230 from each other. According to circumstances, a partition wall corresponding to an upper case (not shown) may be formed so as to achieve the above-mentioned isolation.

Figure 10:
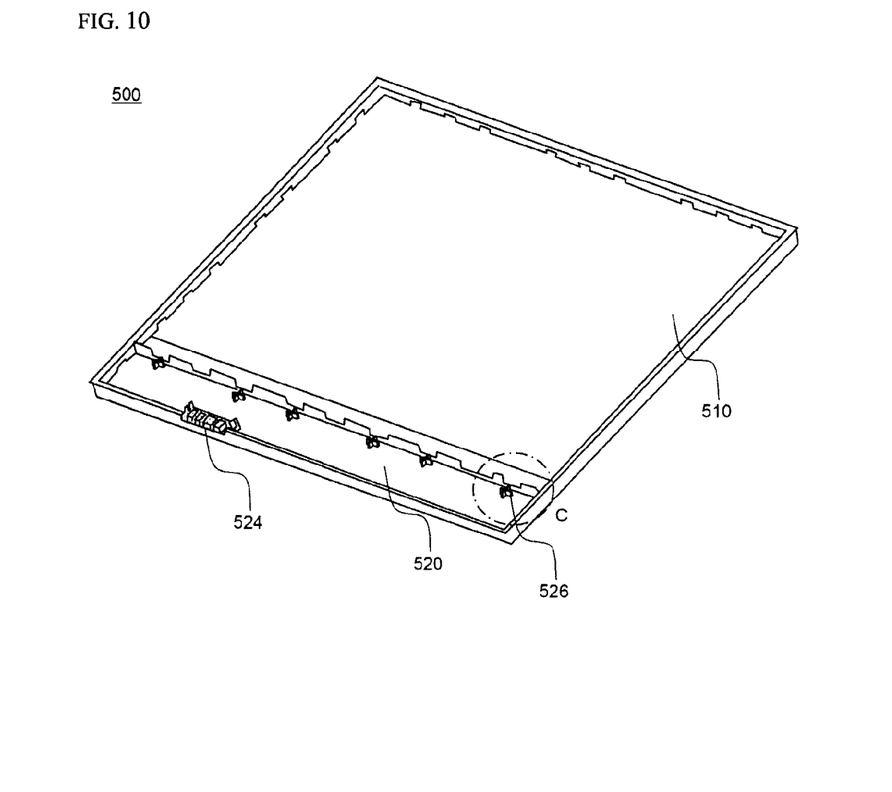
FIG. 10 is a perspective view of the lower case shown in FIG. 8.
Figure 11:
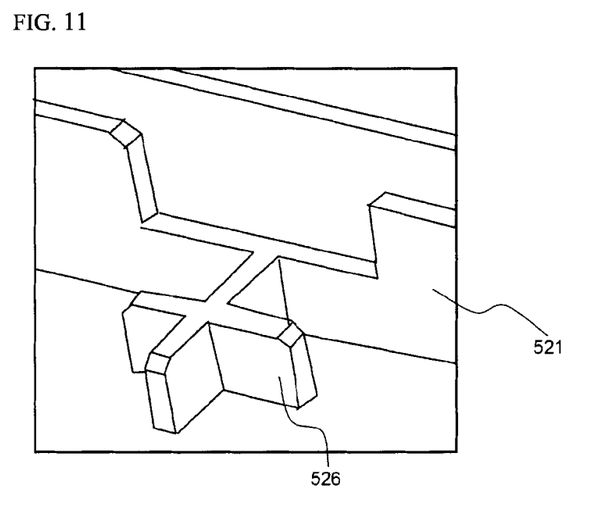
FIG. 11 is an enlarged view typically showing a region C of FIG. 10.

FIG. 10 is a perspective view typically showing the lower case of FIG. 8, and FIG. 11 is an enlarged view typically showing a region C of FIG. 10.

Referring to these drawings together with FIGS. 8 and 9, an external input and output terminal mounting part 524, in which the external input and output terminal 238, which inputs electric current to the battery pack, outputs electric current from the battery pack, and transmits and receives information to and from the battery pack, is mounted, is formed at the protection circuit module mounting part 520 of the lower case 500.

Also, a support part 526 to support the electrical connection region between the electrode terminal 222 of each of the battery cells 220 and the protection circuit module 230 is formed on the lower case 500 in the shape of an upward cross-shaped protrusion in a state in which the support part 526 is connected to the partition wall 521. The support part 526 appropriately supports downward pressure applied by a welding tip (not shown) to be located above the electrode terminal 222 of each of the battery cells 220 (specifically, above the second connection part 236 (see FIG. 4), which is the bent portion of the conductive plate 239 (see FIG. 4)) during resistance welding, thereby providing high welding force.

Figure 12:
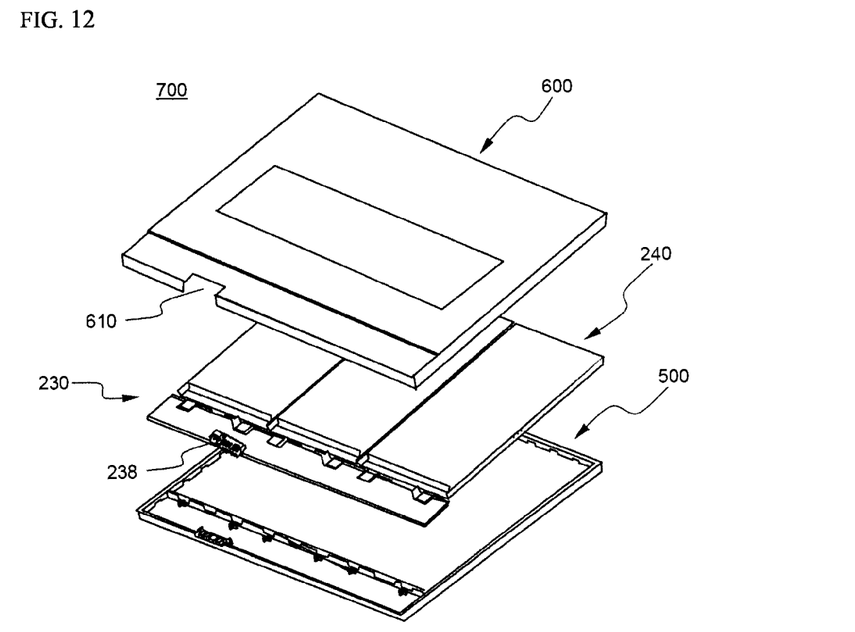
FIGS. 12 and 13 are an exploded view and a perspective view showing a battery pack according to an embodiment of the present invention.
Figure 13:
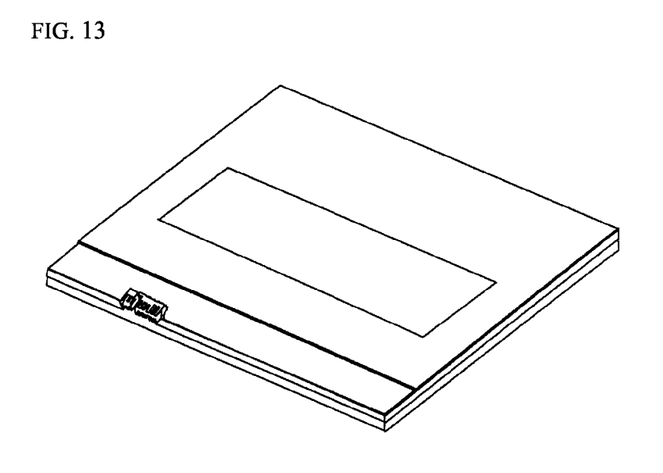

FIGS. 12 and 13 are an exploded view and a perspective view showing a battery pack according to an embodiment of the present invention.

Referring to these drawings, the pack case includes a lower case 500 to which the battery cell array 240 and the protection circuit module 230 are mounted and an upper case 600 disposed above the lower case 500 so that the upper case 600 covers the lower case 500 to fix the battery cell array 240 and the protection circuit module 230 in place.

Also, an external input and output terminal opening 610 is formed at the front of the upper case 600 in a state in which the external input and output terminal opening 610 has a size corresponding to an external input and output terminal 238. Consequently, only the external input and output terminal 238 is exposed from a battery pack 700.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery pack according to the present invention is configured so that the electrical connection region between the cathode terminal of each of the battery cells and the protection circuit module is welded to have a structure in which a conductive plate attached to a corresponding connection terminal of the protection circuit module surrounds the cathode terminal of each of the battery cells. Consequently, it is possible to manufacture a battery pack of a compact structure and high weldability.

Also, series or parallel connection between the battery cells is achieved by the metal wires formed at the top of the protection circuit module. Consequently, additional members to interconnect the electrode terminals are not needed, thereby greatly reducing manufacturing time and manufacturing costs.

The invention claimed is:
1. A battery pack comprising:
(a) a battery cell array comprising two or more battery cells, each of which has an electrode assembly of a cathode, anode and separator disposed between the aforementioned anode and cathode structure disposed in a battery case together with an electrolyte in a sealed state, arranged in a lateral direction;
(b) a protection circuit module (PCM) comprising connection terminals connected to electrode terminals of the battery cells by resistance welding, metal plates to electrically connect the battery cells to each other, and a protection circuit to control an operation of the battery pack, the PCM being connected to an upper end of the battery cell array; and
(c) a pack case in which the battery cell array and the protection circuit module are disposed,
wherein electrical connection regions between cathode terminals of the battery cells and the protection circuit module are configured to have a structure in which conductive plates attached to tops of the respective connection terminals of the protection circuit module are welded so that the conductive plates surround the respective cathode terminals of the battery cells,
wherein the conductive plates are attached to the connection terminals of the protection circuit module so that the conductive plates can be bent, the conductive plates are bent in a bracket shape in a state in which the cathode terminals of the battery cells are placed on the conductive plates, and resistance welding is carried out from above the bent portions of the conductive plates,
wherein the pack case comprises a lower case at which the battery cell array and the protection circuit module are disposed and an upper case to cover the lower case so that the battery cell array and the protection circuit module are fixed in place,
wherein the lower case is partitioned into a battery cell mounting part, at which the battery cells are disposed, and a protection circuit module mounting part, at which the protection circuit module is disposed,
wherein a partition wall extends upwardly from a bottom wall of the lower case between the battery cell mounting part and the protection circuit module mounting part, openings, through which electrode terminals of the battery cells are exposed toward the protection circuit module, being formed at portions of the partition wall corresponding to electrical connection regions between the electrode terminals of the battery cells and the protection circuit module, wherein the portions of the partition wall have a reduced height to form the openings,
wherein the protection circuit module mounting part comprises support parts to support the electrical connection regions between the electrode terminals of the battery cells and the protection circuit module, and
wherein the support parts extend upwardly from the bottom surface of the lower case and extending from the portions of the partition wall to be under the electrical connection regions between the electrode terminals of the battery cells and the protection circuit module, the support parts having a height equal to the reduced height of the portions of the partition wall and being in the shape of an upward cross-shaped protrusion to support downward pressure applied by a welding tip to be located above the electrode terminal of each of the battery cells, during resistance welding.

2. The battery pack according to claim 1, wherein the battery cell array comprises three battery cells.

3. The battery pack according to claim 1, wherein the battery cells are electrically connected in (i) series or (ii) parallel or (iii) series and parallel to each other.

4. The battery pack according to claim 1, wherein each of the conductive plates comprises a first connection part attached to the top of a corresponding one of the connection terminals of the protection circuit module and a second connection part attached to a top of the cathode terminal of a corresponding one of the battery cells.

5. The battery pack according to claim 1, wherein each of the conductive plates is a nickel plate, and each of the cathode terminals of the battery cells is an aluminum terminal.

6. The battery pack according to claim 1, wherein each of the battery cells is a pouch-shaped secondary battery.

7. The battery pack according to claim 1, wherein an external input and output terminal to input electric current to the battery pack, to output electric current from the battery pack, and to transmit and receive information to and from the battery pack, are mounted at a front of the protection circuit module in a depressed form.

8. The battery pack according to claim 7, wherein the external input and output terminal is a connector.

9. The battery pack according to claim 1, wherein metal wires to electrically connect the battery cells to each other are formed at a top of the protection circuit module.

10. The battery pack according to claim 1, wherein the partition wall isolates the battery cell mounting part and the protection circuit module from each other.

11. The battery pack according to claim 1, wherein the protection circuit module mounting part is provided with an external input and output terminal mounting part, in which an external input and output terminal to input electric current to the battery pack, to output electric current from the battery pack, and to transmit and receive information to and from the battery pack is mounted.

12. A laptop computer comprising a battery pack according to claim 1 as a power source.

13. The battery pack according to claim 1, wherein the conductive plates comprise a first conductive plate on a top surface of the PCM and a second conductive plate extending upwardly from the PCM, the second conductive plate attached to the first conductive plate along a bend line.

14. The battery pack according to claim 1, further comprising a notch in a front edge of the PCM; and an external input and output terminal attached to the PCM at the notch, wherein the connection terminals are formed in a rear edge of the PCM opposite the front edge.

* * * * *